United States Patent
Kharel et al.

(10) Patent No.: US 12,480,927 B1
(45) Date of Patent: Nov. 25, 2025

(54) WATER USAGE MONITOR AND TRACKING

(71) Applicant: EOG Resources, Inc., Houston, TX (US)

(72) Inventors: Pratik Kharel, Houston, TX (US); Mark Metzger, Houston, TX (US); Warren Sharp, Humble, TX (US); Aaron Carl Shaffer, Houston, TX (US); Jude Lloyd Ankrah, Cypress, TX (US); Justin Alan Ward, Houston, TX (US); Alexey Lukyanov, Houston, TX (US); Ashley Sean Kessel, Bellaire, TX (US); Alexander P. Jones, Houston, TX (US); Bradley Bennett Burt, Corpus Christi, TX (US); Nathan Rice, Durham, NC (US); Dustin Cole Kinder, Houston, TX (US)

(73) Assignee: EOG Resources, Inc., Houston, TX (US)

(*) Notice: Subject to any disclaimer, the term of this patent is extended or adjusted under 35 U.S.C. 154(b) by 925 days.

(21) Appl. No.: 17/035,600

(22) Filed: Sep. 28, 2020

Related U.S. Application Data

(60) Provisional application No. 62/924,457, filed on Oct. 22, 2019, provisional application No. 62/907,085, filed on Sep. 27, 2019.

(51) Int. Cl.
*G01N 33/18* (2006.01)
*E21B 49/08* (2006.01)
(Continued)

(52) U.S. Cl.
CPC ......... *G01N 33/18* (2013.01); *E21B 49/0875* (2020.05); *G05B 19/0428* (2013.01);
(Continued)

(58) Field of Classification Search
CPC ... G01N 33/18; E21B 49/0875; E21B 21/062; E21B 33/13; E21B 43/26; G05B 19/0428;
(Continued)

(56) References Cited

U.S. PATENT DOCUMENTS

| 6,243,483 | B1* | 6/2001 | Petrou | F17D 5/00 |
| | | | | 382/103 |
| 10,242,414 | B2* | 3/2019 | Scolnicov | F17D 5/02 |

(Continued)

FOREIGN PATENT DOCUMENTS

CN 102636814 B * 12/2015

OTHER PUBLICATIONS

English translation for CN-102636814-B (Year: 2015).*

*Primary Examiner* — Lee E Rodak
*Assistant Examiner* — Byung Ro Lee
(74) *Attorney, Agent, or Firm* — Baker Botts L.L.P.

(57) ABSTRACT

System and methods for water management method for managing water used in extraction of fluids from subsurface formations wherein water is stored in a plurality of water pits and further wherein water is obtained from one or more water wells. The method includes simulating water pit volumes to determine a water level in each of the water pits at a pit volume simulation time; performing water chemistry analysis to determine one or more chemical properties of water stored in one of the water pits; performing a mapping operation to determine one or more pipeline routes, pit-pit transfer lines, and gathering systems; performing water pit evaporation analysis for a water pit evaporation simulation time; and performing a cost data capture to determine forecast costs at a cost data capture simulation time.

14 Claims, 16 Drawing Sheets

(51) Int. Cl.
*G05B 19/042* (2006.01)
*G06Q 10/047* (2023.01)
*G06Q 10/0631* (2023.01)
*G06Q 10/0637* (2023.01)
*G06Q 10/067* (2023.01)
*G06Q 50/06* (2024.01)
*E21B 21/06* (2006.01)
*E21B 33/13* (2006.01)
*E21B 43/26* (2006.01)

(52) U.S. Cl.
CPC ..... *G06Q 10/047* (2013.01); *G06Q 10/06312* (2013.01); *G06Q 10/06315* (2013.01); *G06Q 10/06375* (2013.01); *G06Q 10/067* (2013.01); *G06Q 50/06* (2013.01); *E21B 21/062* (2013.01); *E21B 33/13* (2013.01); *E21B 43/26* (2013.01); *G05B 2219/24215* (2013.01)

(58) Field of Classification Search
CPC ....... G05B 2219/24215; G06Q 10/047; G06Q 10/06312; G06Q 10/06315; G06Q 10/06375; G06Q 10/067; G06Q 50/06
USPC .......................................................... 702/2
See application file for complete search history.

(56) References Cited

U.S. PATENT DOCUMENTS

| | | | |
|---|---|---|---|
| 2014/0166210 A1* | 6/2014 | Hudgens | B01D 1/18 159/3 |
| 2015/0144336 A1* | 5/2015 | Hardin | E21B 43/2607 166/250.01 |
| 2018/0100480 A1* | 4/2018 | Duquette | F03B 3/10 |
| 2018/0291728 A1* | 10/2018 | Erge | E21B 21/08 |

* cited by examiner

WATER USAGE MONITOR AND TRACKING

CROSS-REFERENCE TO RELATED APPLICATION

This application claims priority to U.S. Provisional Application No. 62/907,085 filed Sep. 27, 2019 entitled "Water Usage Monitoring and Tracking" by Pratik Kharel, Mark Metzger, and Warren Sharp. This application claims priority to U.S. Provisional Application No. 62/924,457 filed Oct. 22, 2019 entitled "Anomaly Detection in Pipelines and Flowlines" by Justin Alan Ward, Alexey Lukyanov, Ashley Sean Kessel, Alexander P. Jones, Bradley Bennett Burt, and Nathan Rice.

BACKGROUND

The extraction of fluids from subsurface formations may require significant amount of water. By way of example, significant amounts of water may be used for completion operations in wellbore. In many locations, water may be a significant cost to the overall operation. Monitoring and managing that water usage therefore presents a unique challenge for the process of extracting fluids from one or more subsurface formations.

BRIEF DESCRIPTION OF THE DRAWINGS

FIG. 2 is a screen shot of example modules and toolkits for methods and systems according to the present disclosure.

FIGS. 4-6 are screen shots of example modules of methods and systems according to the present disclosure.

FIGS. 14-16 are screen shots of the system according to the present disclosure.

Figure 1:
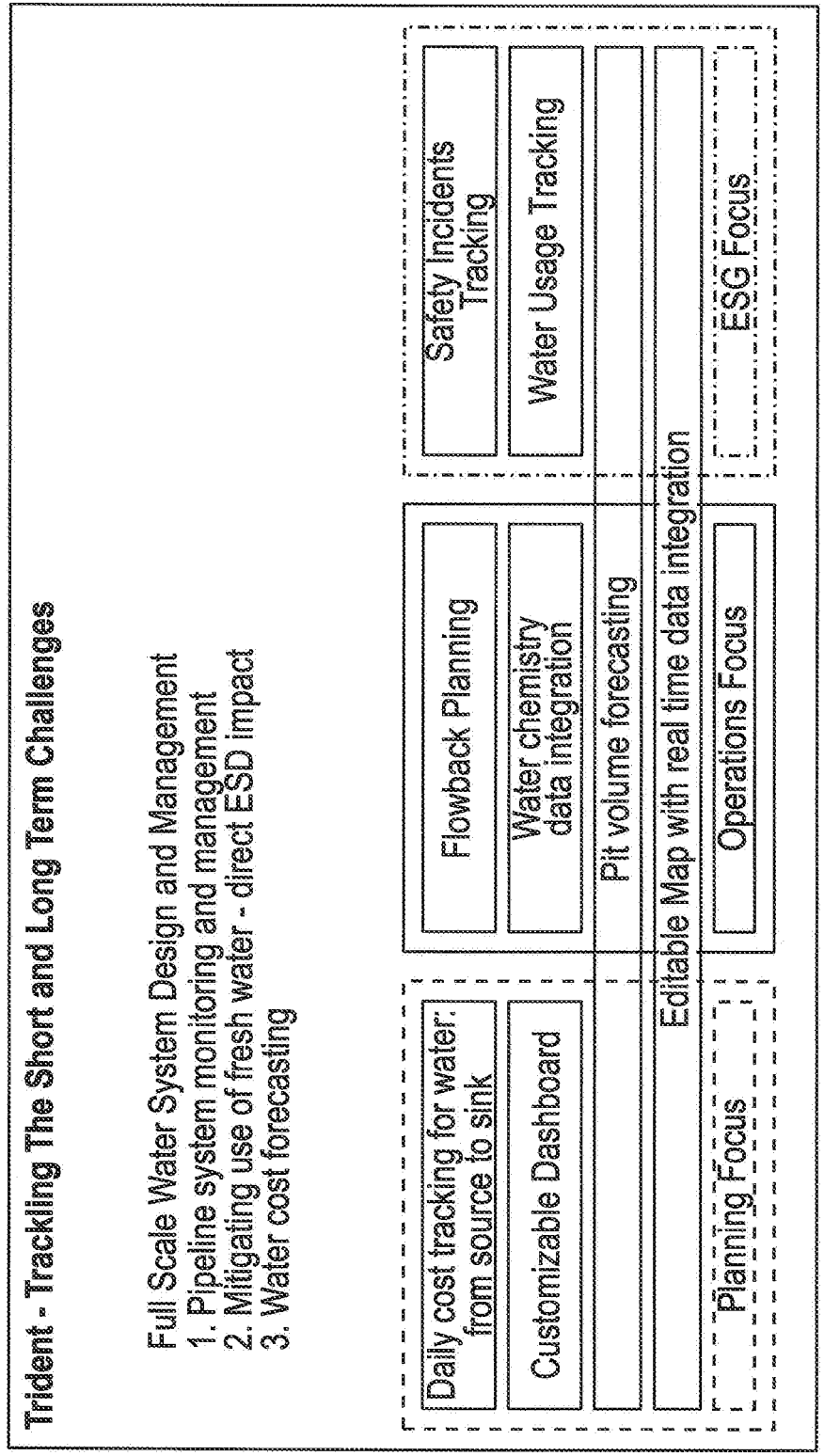
FIG. 1 is a chart of focuses served by example water usage monitoring and tracking systems and methods.

While embodiments of this disclosure have been depicted and described and are defined by reference to exemplary embodiments of the disclosure, such references do not imply a limitation on the disclosure, and no such limitation is to be inferred. The subject matter disclosed is capable of considerable modification, alteration, and equivalents in form and function, as will occur to those skilled in the pertinent art and having the benefit of this disclosure. The depicted and described embodiments of this disclosure are examples only, and not exhaustive of the scope of the disclosure.

DETAILED DESCRIPTION

For the purposes of this disclosure, computer-readable media may include any instrumentality or aggregation of instrumentalities that may retain data and/or instructions for a period of time. Computer-readable media may include, for example, without limitation, storage media such as a direct access storage device (e.g., a hard disk drive or floppy disk drive), a sequential access storage device (e.g., a tape disk drive), compact disk, CD-ROM, DVD, RAM, ROM, electrically erasable programmable read-only memory (EEPROM), and/or flash memory; as well as communications media such as wires, optical fibers, microwaves, radio waves, and other electromagnetic and/or optical carriers; and/or any combination of the foregoing.

Illustrative embodiments of the present invention are described in detail herein. In the interest of clarity, not all features of an actual implementation may be described in this specification. It will of course be appreciated that in the development of any such actual embodiment, numerous implementation-specific decisions may be made to achieve the specific implementation goals, which may vary from one implementation to another. Moreover, it will be appreciated that such a development effort might be complex and time-consuming, but would nevertheless be a routine undertaking for those of ordinary skill in the art having the benefit of the present disclosure.

In certain example embodiments of the present disclosure, a monitoring, management, and planning tool for produced, reuse, and fresh/non-fresh water is provided. Certain example embodiments feature a pipeline sketching tool that allows a user to configure and move pipeline nodes and pumps. For the monitoring aspect, certain example embodiments integrate one or more SCADA data streams (for example, Cygnet, Redlion, Ignition systems). In certain example embodiments, for the longer-term planning, especially in terms of water reuse, a reuse pit volumes simulator is provided. Example reuse pit volume simulators predict a volume of water remaining in the reuse pits given the amount of water required for operations (completions and drilling primarily).

To facilitate a better understanding of the present invention, the following examples of certain embodiments are given. In no way should the following examples be read to limit, or define, the scope of the invention.

The terms "couple" or "couples," as used herein are intended to mean either an indirect or direct connection. Thus, if a first device couples to a second device, that connection may be through a direct connection, or through an indirect electrical connection via other devices and connections. Similarly, the term "communicatively coupled" as used herein is intended to mean either a direct or an indirect communication connection. Such connection may be a wired or wireless connection such as, for example, Ethernet or LAN. Such wired and wireless connections are well known to those of ordinary skill in the art and will therefore not be discussed in detail herein. Thus, if a first device communicatively couples to a second device, that connection may be through a direct connection, or through an indirect communication connection via other devices and connections.

Certain example embodiments feature a pipeline design application. The pipeline design application estimates the amount of pressure drop for a given volume of water flowing through the pipelines. For example, the pipeline design application allows a user to see the effect of flowing 100 Mbbl of water would do to the water gathering system in terms of creating flow and pressure bottlenecks.

FIG. 1 is a diagram showing overlapping focuses of the systems, method, and application of the present disclosure. In particular, as shown in the figure, the "focuses" are planning focus, operation focus, and ESG focus. Certain example embodiments of the present disclosure are directed to full-scale water system design and management. Example embodiments include pipeline system monitoring an management. Example embodiments include mitigating the use of fresh water. Example embodiments include water cost forecasting.

Figure 2:
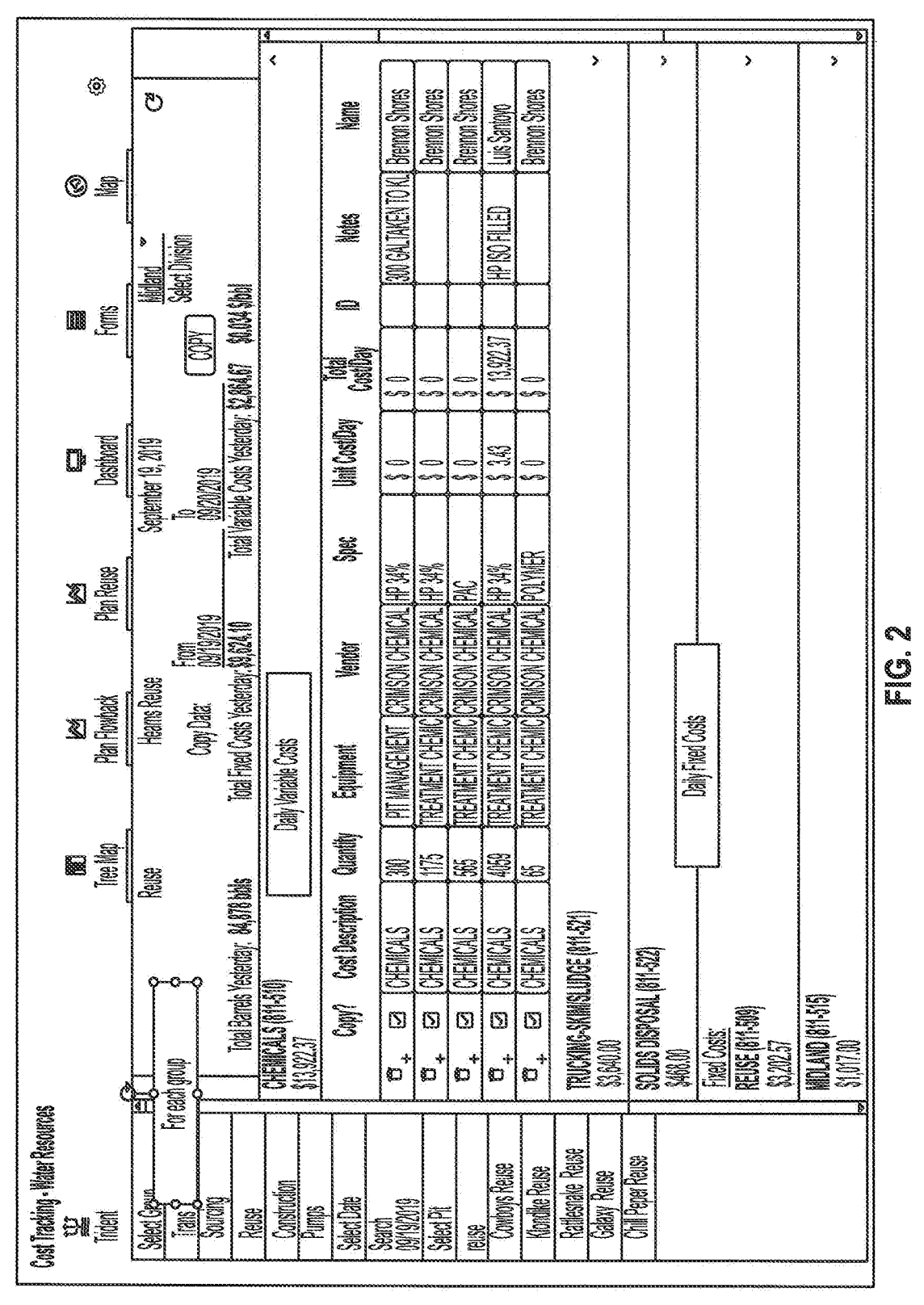

FIG. 2 is an example screenshot showing cost tracking for water resources. As shown in the left-hand pane, the application tracks usage by "groups" including transfer, sourcing, reuse, construction, pumps. Example embodiments are configurable by date. Example embodiment include example reuses, as shown in FIG. 2. Example embodiments track variable costs for a time period (for example, hour, day, week, month, or year). Example embodiments father track fixed costs for a time period.

Figure 3:
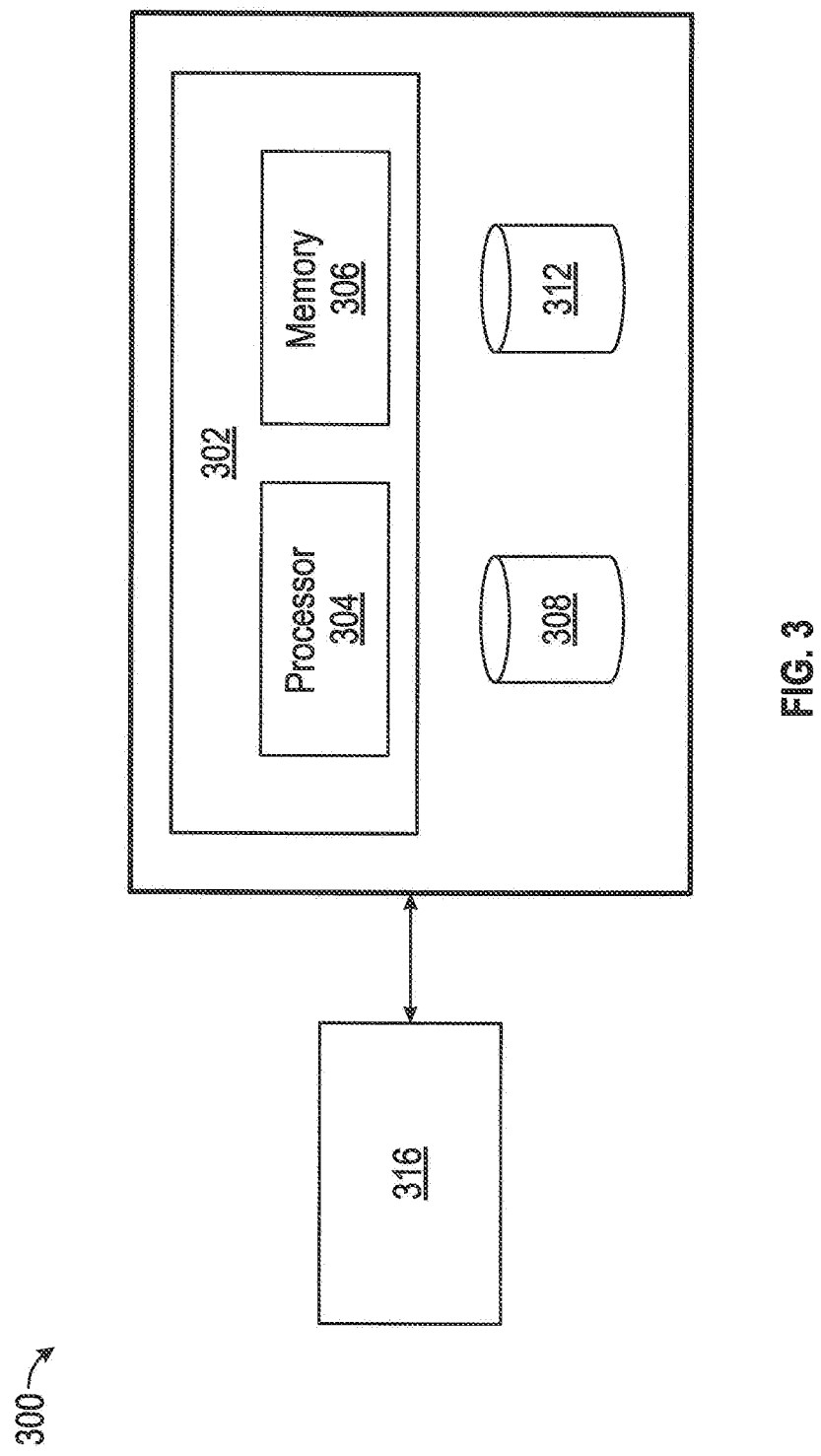
FIG. 3 is a block diagram of an example system according to the present disclosure.

FIG. 3 illustrates a block diagram of an exemplary control unit 300 in accordance with some embodiments of the present disclosure. In certain example embodiments, control unit 300 may be configured to create and maintain a database 308. In other example embodiments, control unit 300 may be configured to control the operation of one or more pumps or other features involved in the management or use of water. In some embodiments, control unit 300 may include control system 302. Control system 302 may include any suitable components. For example, in some embodiments, control system 302 may include one more processors, such as processor 304. Processor 304 may include, for example a microprocessor, microcontroller, digital signal processor (DSP), application specific integrated circuit (ASIC), or any other digital or analog circuitry configured to interpret and/or execute program instructions and/or process data. In some embodiments, processor 304 may be communicatively coupled to memory 306. Processor 304 may be configured to interpret and/or execute non-transitory program instructions and/or data stored in memory 306. Program instructions or data may constitute portions of software for carrying out a drilling operation in a subterranean formation, as described herein. Memory 306 may include any system, device, or apparatus configured to hold and/or house one or more memory modules: for example, memory 306 may include read-only memory, random access memory, solid state memory, or disk-based memory. Each memory module may include any system, device or apparatus configured to retain program instructions and/or data for a period of time (e.g., computer-readable non-transitory media).

Although control unit 300 is illustrated as including two databases, control unit 300 may contain any suitable number of databases.

Control unit 300 may be communicatively coupled to one or more displays 316 such that information processed by sensor control system 302 may be conveyed to operators of drilling and logging equipment at the wellsite or may be displayed at a location offsite.

Modifications, additions, or omissions may be made to FIG. 3 without departing from the scope of the present disclosure. For example, FIG. 3 shows a particular configuration of components for control unit 300. However, any suitable configurations of components may be used. For example, components of control unit 300 may be implemented either as physical or logical components. Furthermore, in some embodiments, functionality associated with components of control unit 300 may be implemented in special purpose circuits or components. In other embodiments, functionality associated with components of control unit 300 may be implemented in a general-purpose circuit or components of a general-purpose circuit. For example, components of control unit 300 may be implemented by computer program instructions. Control unit 300 or components thereof can be located at the surface, downhole (e.g., in the BHA and/or in the logging tool), or some combination of both locations (e.g., certain components could be disposed at the surface and certain components could be disposed downhole, where the surface components are communicatively coupled to the downhole components).

Figure 4:
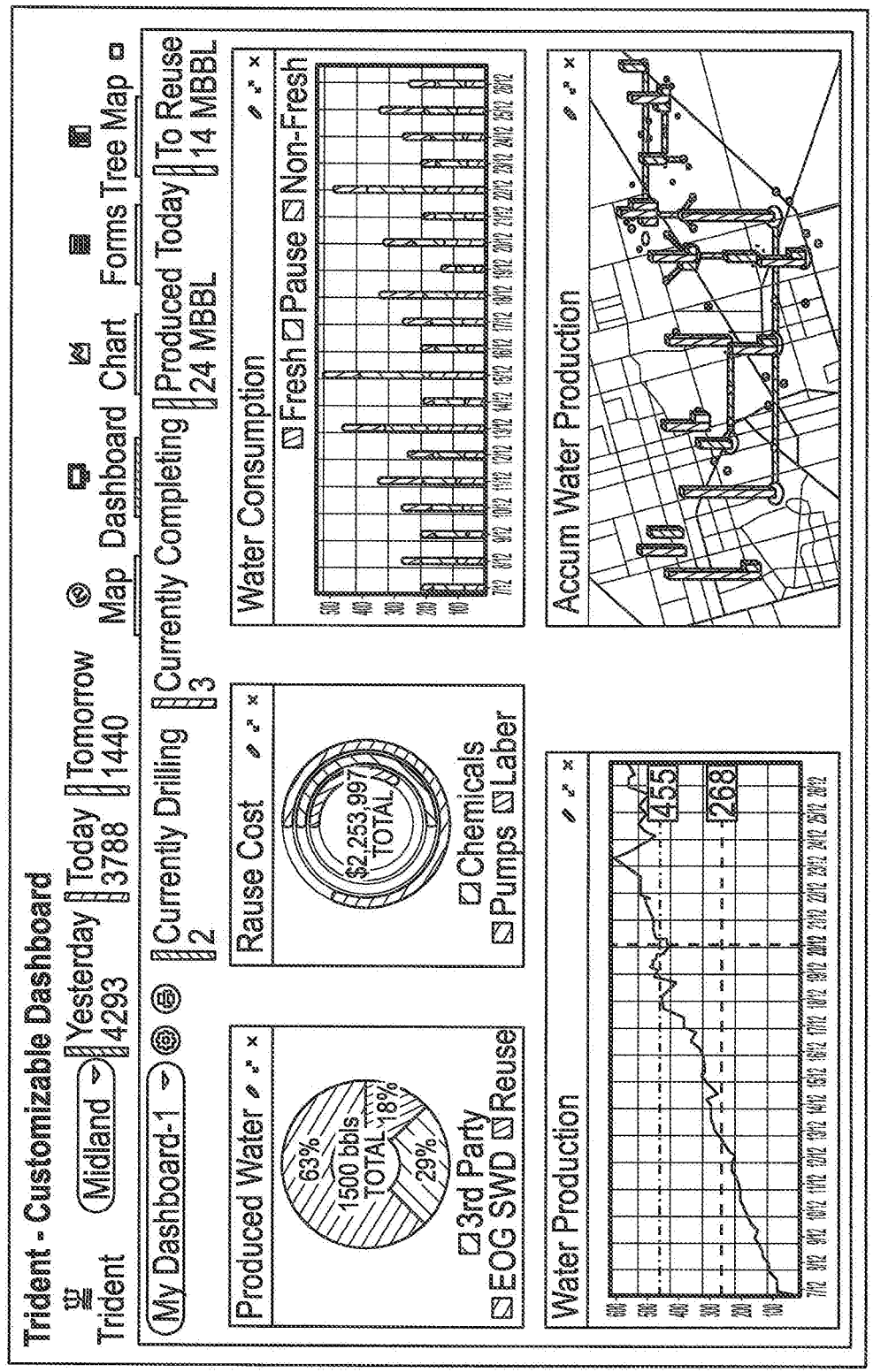

FIG. 4 is a screen shot of a dashboard according to an embodiment of the present disclosure. In certain embodiments, the dashboard is customizable. The example dashboard shows produced water, reuse costs, water consumption, water production, and accumulative water production. Example embodiments may include all or some of these elements.

Figure 5:
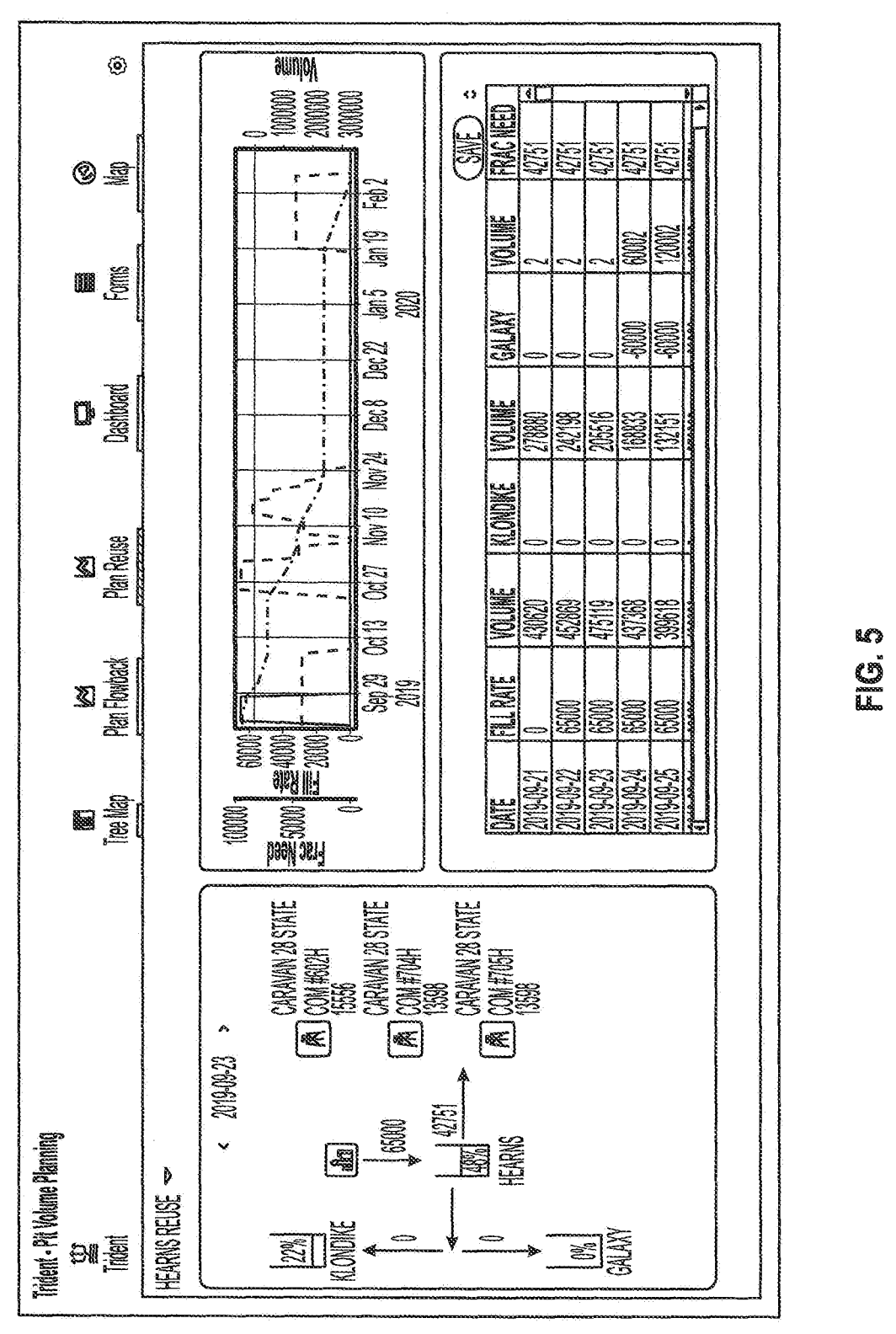

FIG. 5 is a screen shot of an example pit volume planning module of the present disclosure. In the left pane, the Hearns pit reuse for Sep. 9, 2019 is illustrated. This show in-flows and out-flows for the Hearns pit. The icons on the left with the percentage values inside them represent individual pits. The icons under the wells represent wells that were scheduled to be pulling water from the selected pit. In the upper right hand pane is a chart showing fracture needs in barrels (orange), volume of water in the pit (green), and fill rate (in barrels/day) in blue. In the lower right-hand pane is a chart showing fill rate, volume of the pit, amount of water transferred to Galaxy bit, amount of water transferred to Klondike pit, and amount of water for fracturing need by day. Other example embodiments work on other time scales (for example, hourly, daily, weekly, or monthly). In certain example embodiments, the pit volume simulator is linked to a completions schedule and the design. As the completions/reservoir team change the design, or the schedule certain implementations will recalculate the required water volumes for completions, and calculate the remaining pit volumes in real time.

Figure 6:
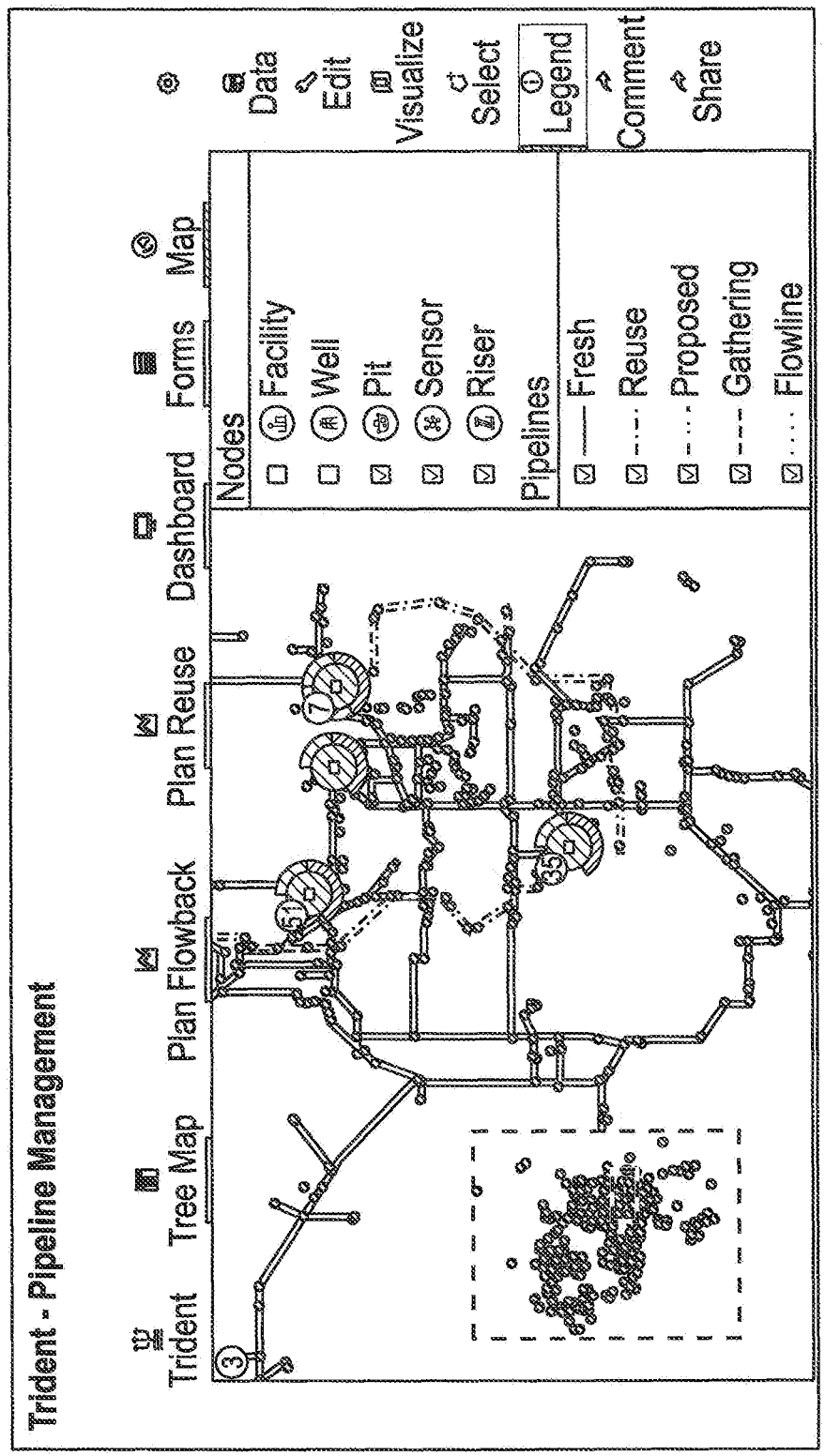

FIG. 6 is a diagram of a map view of the water management system. Nodes in the map may include one or more of facilities, wells, pits, sensors, and risers. The nodes may be connected by one or more pipelines or flowline. As shown in the figure the pipelines may be for fresh water, reuse, or gathering. In the application, a user may also include proposed pipeline or flowlines. Certain example embodiments feature a fully editable map that is built out as edges (pipes) and nodes (anything else). Certain example embodiments include integrated sensors or SCADA systems. In certain embodiments, the sensors provide one or more real-time metrics for any production well, facility, or as indicated around the pits (in pink) the current levels of the pit.

Figure 7:
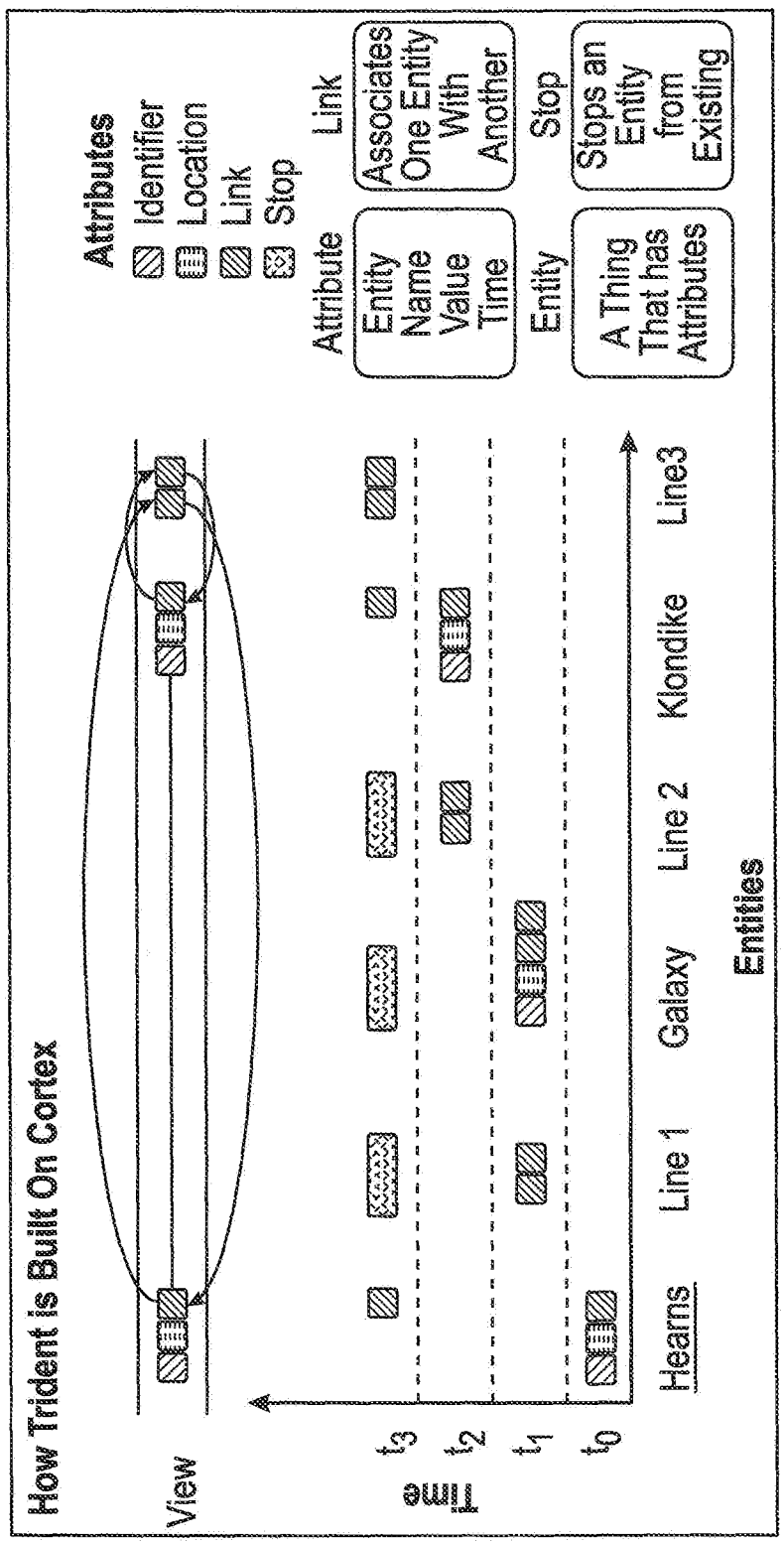
FIG. 7 is a diagram showing example implementations of a data store according to the present disclosure.

FIG. 7 is a diagram showing how the example water management application may make use of a data store, which may be referred to as Cortex. In one example use the user wants to remove the galaxy pit and associated transfer lines from the map and connect the Hearns and Klondike pits directly using new transfer line 3. An example implementation include a STOP feature that allows the user to stop the existence of the galaxy and its transfer lines at the same time we lay a new transfer line between Hearns and Klondike. The view at the top shows what Cortex returns for time t3. In certain example implementations, all previous data is still available even after this change.

Example implementations of the present system created about 100,000 entities plus their associated attributes. Example embodiments at a scale of 100,000 wide, changing attributes over time as users modify their view of the world, make use of Cortex managing millions of attributes over time, with an ability to go back and view at any point in time.

Attributes are delivered to an import process in Cortex that determines for each attribute whether it is a new or an existing attribute. New attributes are imported into the attribute store, and all delivered attributes are copied to an audit log.

Certain example embodiments include a Cortex data store. In certain example embodiments, the Cortex data store acts like a Blockchain of data by recording the time and user of every attribute it receives. In certain eample embodiments, the Cortex data store does not use a distributed ledger. In certain eample embodiments, the Cortex data store has a complete history of every single change made to the dataset making it similar to a blockchain. In certain example implementations, the import process to the data store does not allow delete operations to the attribute store. Because time is recorded for every attribute, an immutable time-history of all attributes is recorded in the system. In certain example implementations, the API implements a mechanism to fetch attributes from the attribute store given a desired maximum timestamp.

In certain example implementations, the Cortex data store accepts any attribute at any time. In certain example implementations, no prior configuration is required or necessary within the Cortex data store. In certain example embodiments, the Cortex data store provides an immutable ledger in which no deletes can happen. In such a system, a user can retrieve old data from any point in time stored. In certain example embodiments, the Cortex data store provides a streaming data warehouse that can accept any new data at any time, on the fly. In certain example embodiments, the Cortex data store provides self-service data API. The self-service data API allows UI developers and others create applications without requiring any specific "database" work. In certain example implementations, the Cortex self-service data API implements a mechanism to fetch, filter, and transform desired data from the attribute store into a user-requested data format that assembles attribute results into a desired consumable format. In certain example implementations, the Cortex self-service API implements a mechanism to publish attributes independently, individually, or in batch, to the Cortex attribute store.

Figure 9:
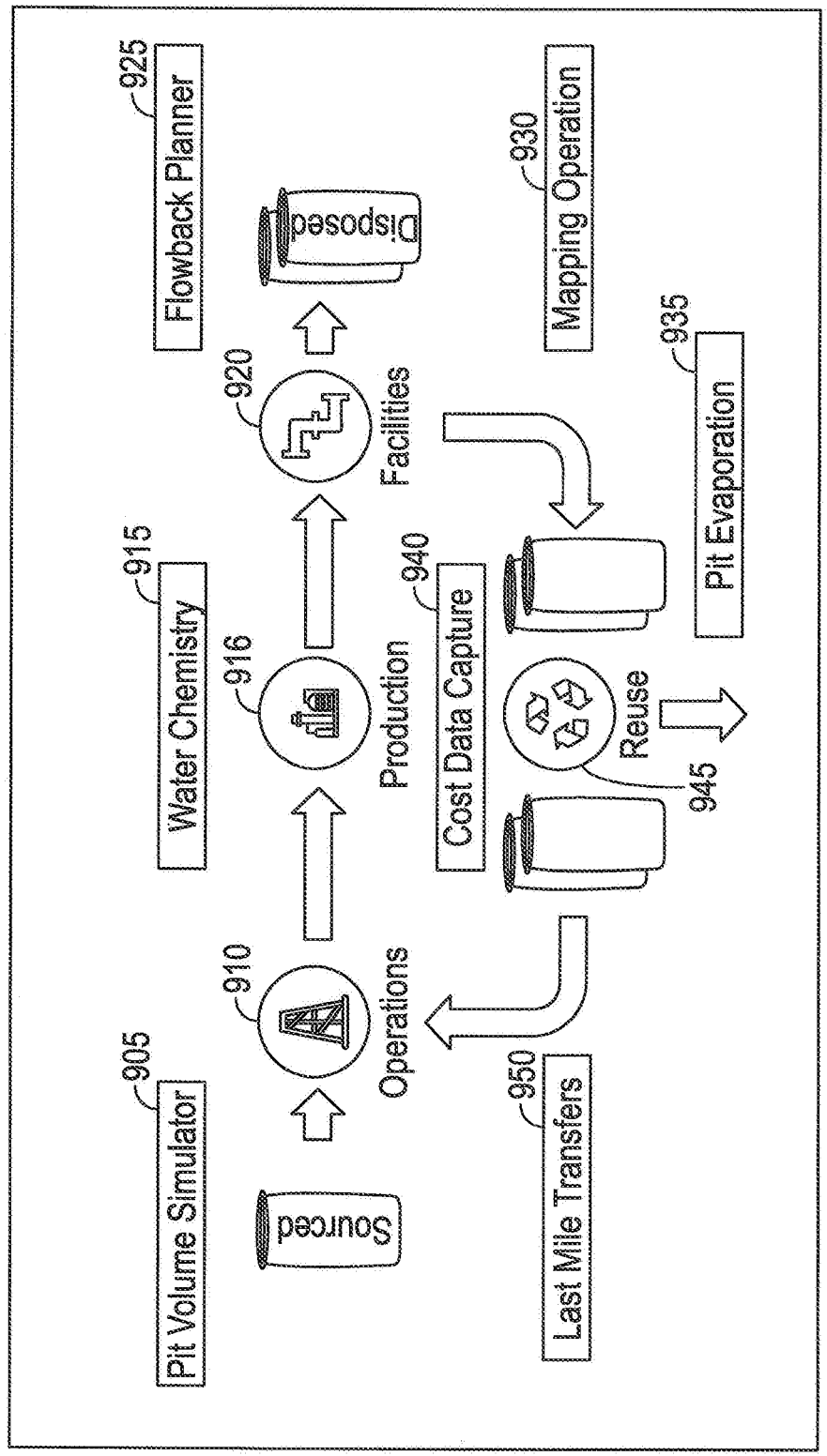
FIG. 9 is a block diagram of water management according to the present disclosure.

FIG. 9 is a block diagram of water management according to the present disclosure. At block 905, the process includes a pit volume simulation to determine the volume of one or more water pits at a pit volume simulation time. In example embodiments, the pit volume simulator uses a volume balance approach. In example embodiments the pit volume simulator determines the water pit volumes at pit volume simulation time based on one or more of historical data, forecasted production, and the pit-pit management system.

At block 910, the process includes one or more operations that require water. In certain example embodiments, the operations include drilling operations, including, for example, one or more of pad construction, the use of drilling mud, and cementing. In other example embodiments, the operations include one or more completion operations including one or more of hydraulic fracturing processes and drill out of plugs.

At block 915, the process includes determining the water chemistry. In certain example embodiments, this includes determining the chemical composition of the water, the salt content (ppm/gm per cc)

In block 916, production operations that make use of water include one or more of production workover procedures or as operations that use water as a kill fluid.

In block 920, facilities operations that make use of water include, for example, pipeline and gathering systems, for example from wellhead to flowline to separation to gathering systems.

In block 930, the system performs a mapping operation to determine pipeline routes, pit-pit transfer lines, gathering systems, and track various other field assets. In example embodiments, the mapping operation is further to view/aggregate SCADA data or data from other sensors. Other field assets include one or more of water transfer pumps, pressure transducers, risers, automation trailers, spill prevention units, production facilities, gathering systems, pits, water sources, drilling/completion sites, sales points. SCADA data or data from sensors includes one or more of realtime transfer rates, pit levels, weather data, pump rates, pit fill rates, pump RPM, oil/gas/water production rates, pressures at pressure transducers, separator conditions, tank volumes, and VFD settings.

In block 940, the system performs a cost data capture process to determine forecast costs at a cost data capture simulation time. In certain embodiments, invoices are either manually entered by field personnel through the system interface or the invoices are populated through an internal automation process.

In block 950, the system performs a last mile transfer analysis process. In certain example implementations, the system performs the last-mile transfer plan and analysis to determine the routes for water transfer pipelines. In certain example embodiments, the last-mile transfer analysis is based on a mapping component to plan out pipeline paths, elevations changes, and map potential hazards. In certain embodiments, the last-mile transfer analysis process is based on one or more completion schedules. Example completion schedules show where drilling well will be and which wells will be bundled as a package. In certain embodiments, the system is integrated with an anomaly/leak detection process.

In certain example embodiments, the system performs anomaly/leak detection as described in U.S. Provisional Application No. 62/924,457 filed Oct. 22, 2019 entitled "Anomaly Detection in Pipelines and Flowlines" by Justin Alan Ward, Alexey Lukyanov, Ashley Sean Kessel, Alexander P. Jones, Bradley Bennett Burt, and Nathan Rice, which is hereby incorporated by reference.

In certain example embodiments, the process of FIG. 9 is performed by one or more computers, each with one or more processors and memory to store data and executable instructions to perform the process.

Figure 10:
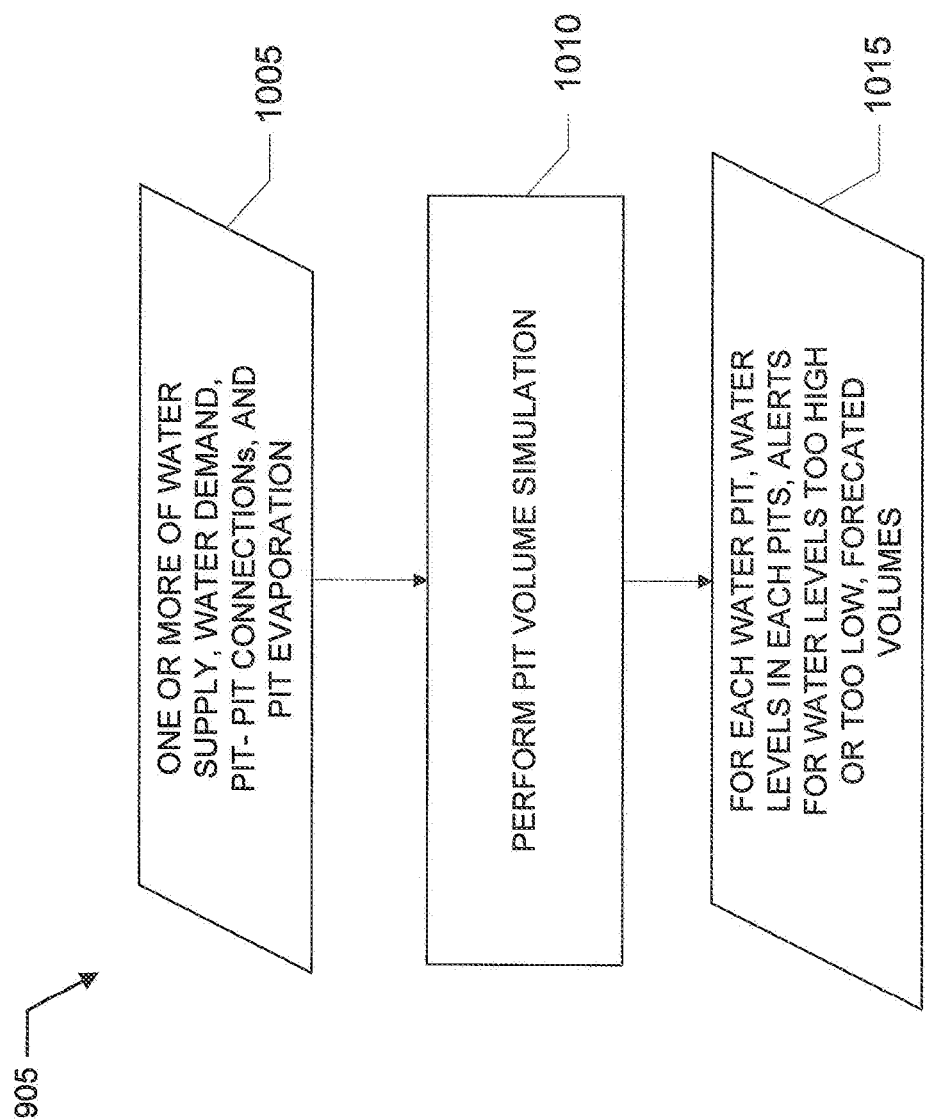
FIG. 10 is a flow chart of an example pit volume simulation process according to the present disclosure.

An example pit volume simulation (block 905) is shown in the flow chart of FIG. 10. In block 1005, the pit volume simulation receives inputs including one or more of water supply, water demand, pit-pit connections, and pit evaporation. The water supply includes one or more of how much water is available at the pit volume simulation time for operations. The water supply at the water pit simulation time may be from one or more of water pits, water well, or produced volumes from one or more available water gathering system. In certain example embodiments the water supply is based on one or more of historical water volume and forecasted water volumes. In certain example embodiments, the input water demand includes how much water is required for operations at the pit volume simulation time. Example water demands include one or more of drilling operations, completion operations, workover procedures, and construction. In certain embodiment, water demand is broken down between water quality. Example water qualities include fresh water, non-fresh water, reuse water, or other water qualities. In certain example embodiments, the pit-connection that are input to the pit volume simulator include a temporal editable schematic that shows how one or more water assets are interconnected at a given time. Example water assets include one or more of water pits, water well, and production facilities. In other example embodiments, the pit-connections may be specified in text or in a pragmatic format. The inputs to the pit volume simulation may be based on pit evaporation (block 935). In certain example embodiments, the pit evaporation simulation is based on one or more weather forecasts, pit dimension, and water properties to calculate the difference in vapor pressure between he water and the atmosphere. The pit evaporation may then calculate the evaporation rate for one or more of the water pits.

In block 1010, the system performs a pit volume simulation for the pit volume simulation time. In example embodiments, the pit volume simulation is based on a volume balance. In example embodiments, the pit volume simulation is based on the following equation:

$$V(@t=FR+TI-TO-ER-OU+V@t-1 \quad (Eq. 1)$$

where Vat is the new pit volume at time t: V@t−1 is the pit volume in the previous timestep: FR is the fill rates from gathering system, or other sources: TI is the Water being transferred in from another pit in the system: TO is the water being transferred out to another pit in the system: ER is the water volume lost due to evaporation; and OU is the water leaving the pit for operational use.

In block 1015, the system outputs, for each of the simulated water pits, a water pit volume at the pit volume simulation time. In example implementations, the system outputs the include the pit levels in each of the interconnected pits. In example implementations, the system outputs alerts for situations where pit levels are too high or too low. In example implementations, the system outputs forecasted volumes are available for ten ore more years into the future. In example implementations, the system outputs results broken down to a daily transfer, extraction, fill, evaporation rates.

Figure 11:
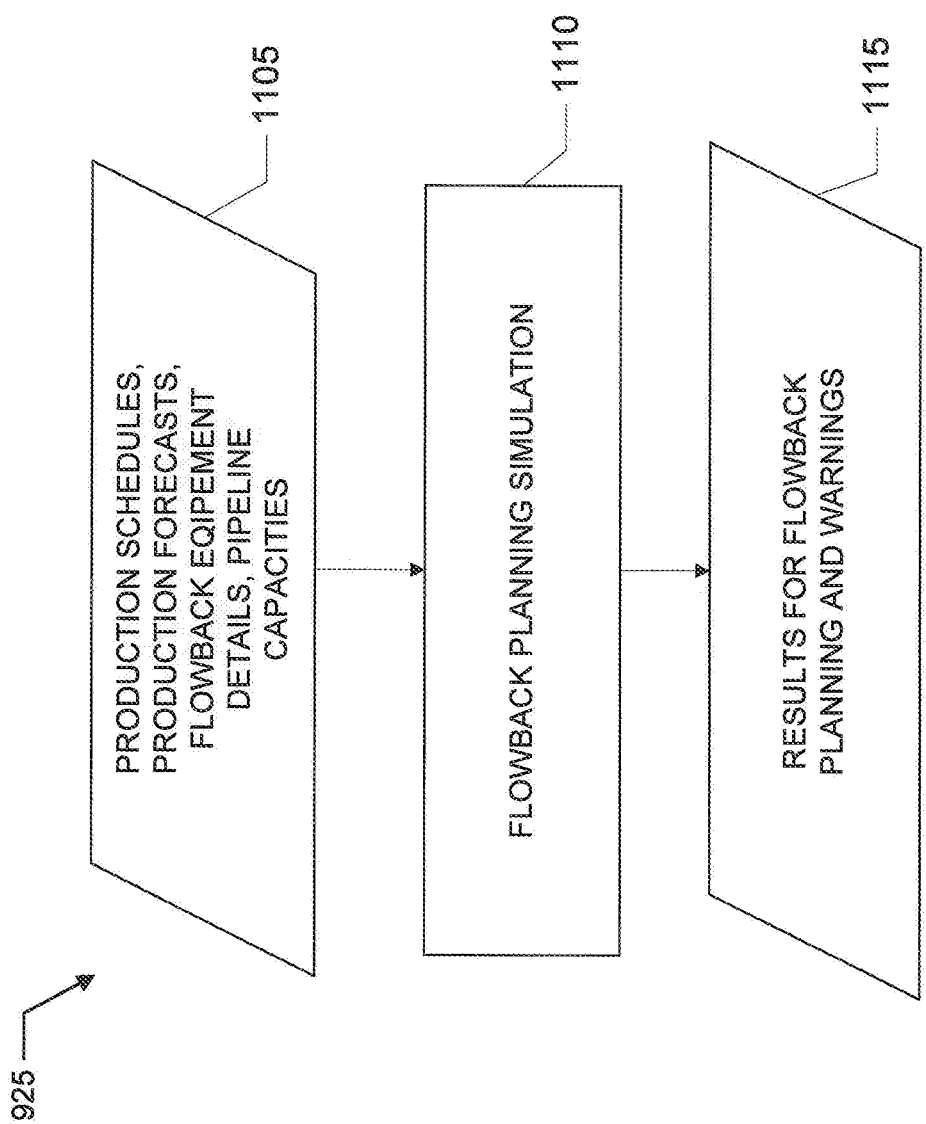
FIG. 11 is a flow chart of an flowback simulation process according to the present disclosure.

An example flow back planning simulation (block 925) is shown in the flowchart of FIG. 11. In block 1105, inputs to the flowback plaining simulation include one or more production schedules, one or more production forecasts for each of the water wells, details of the flow back equipment, and pipeline capacity details. Flowback equipment details include one om roe of equipment that will be available for flow back including sand separators, pumps, fuel stores, electricity access. In block 1110, the system determines an amount of flowback at a flow back simulation time based on the inputs. In block 1115, the system outputs the flow back simulation for the flow back simulation. In some embodiments, the system indicates whether there will be sufficient pipeline or pump capacity based on the flowback simulation. In certain embodiments, the system issues warning or alarms where there may insufficient pipeline or pump capacity.

Figure 12:
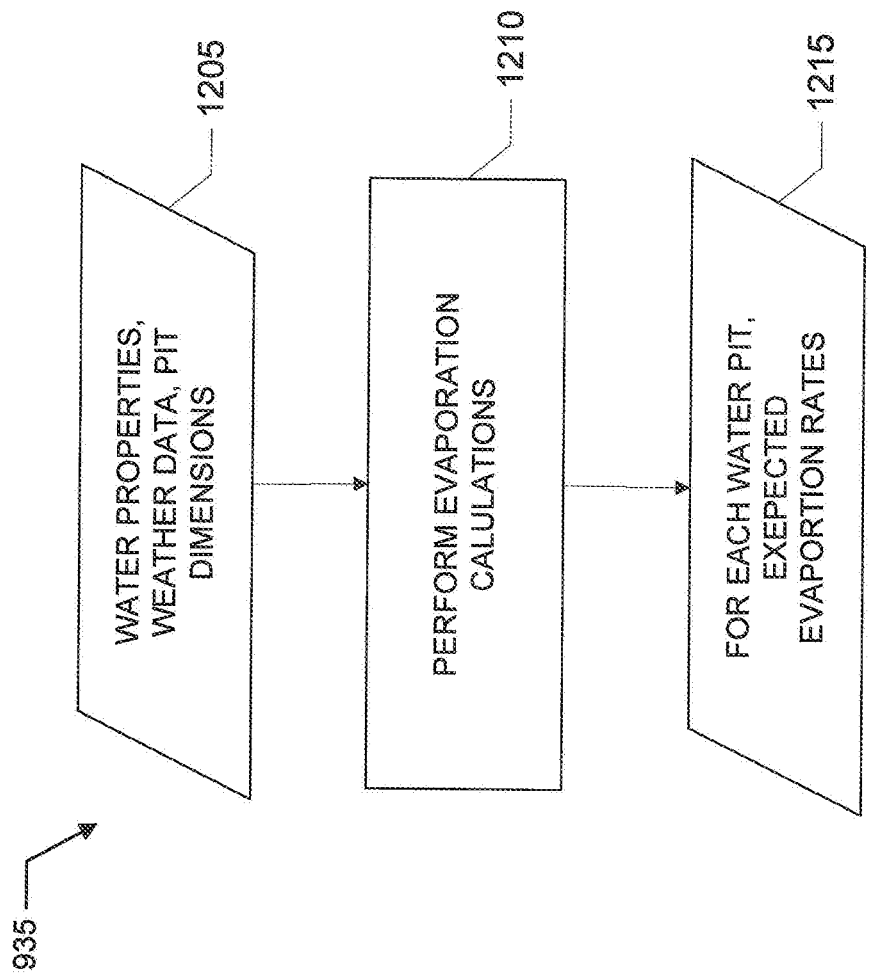
FIG. 12 is a flow chart of an example pit evaporation simulation process according to the present disclosure.

A flow chart showing an example process for pit evaporation simulation (block 935) is shown in FIG. 12. In certain example embodiments the pit evaporation simulation is based on one or more weather forecasts for the pit evaporation simulation time, pit dimensions, and water properties (block 1205). and water properties to calculate the differences in vapor pressures between the water and atmosphere. This is then used to calculate the evaporation rate In certain example embodiments, the pit evaporation simulation is based on one or more weather inputs and one or more pit inputs. Example weather inputs include one or more of ambient temperature T, wind speed, $v_{alt}$, altitude of wind speed measurements alt, and a relative humidity. Example pit inputs include, for each simulated pit, one or more of pit volume, pit elevation (h), and water density. In certain example embodiments, the system determines an evaporation coefficient (θ)

$$\theta = 25 + 19v \quad (Eq. 1)$$

where $$v = v_{alt} \frac{\ln\left(\frac{0.001}{0.0002}\right)}{\ln\left(\frac{alt}{0.0002}\right)} \quad (Eq. 2)$$

In certain example embodiments the system determines, for each water pit being simulated, a pit surface area from volume, A. In certain embodiments, the system determines a pit surface area at the pit evaporation simulation time based, at least in part, on the pit volume at the pit evaporation simulation time. In certain embodiments, the pit surface area is further based on the dimensions and shape of the water pit. In some embodiments, the is a prior observed relationship between the pit volume and pit depth, on the first hand and the pit surface area versus the pit depth, on the second hand. These observed relationships may then be used to determine the pit surface area at a pit evaporation simulation time.

In certain example embodiments the system determines a maximum humidity air ratio, $x_s$:

$$x_s = \frac{0.62198 P_{wv}}{P_{atm} - P_{wv}}, \text{ where} \quad (Eq. 3)$$

$$P_{wv} = \frac{e^{77.345+0.0057T-\left(\frac{7.235}{T}\right)}}{T^{8.2}} \text{ and} \quad (Eq. 4)$$

$$P_{atm} = 101{,}325(1 - 0.000022557h)^{5.25588} \quad (Eq. 5)$$

In certain example embodiments, the pit evaporation at the pit evaporation simulation time is based on a humidity air ratio. In certain embodiments, the humidity air ratio using the following equation:

$$\text{humidity air ratio} = \frac{0.62198 * \text{relativity humidity} * e^x * \frac{1}{100}}{101{,}325 - \text{relative humidity} * e^x * \frac{1}{100}} \quad (Eq. 6)$$

In other example embodiments, the humidity air ratio may be determined using a Mollier diagram. In example embodiments the system then calculates the evaporation rate gs for a water pit using the following equation:

$$g_s = \theta A(x_s - x) \quad (Eq. 7)$$

In block 1215, the system outputs a expected evaporation rate for the one or more water pits.

Figure 13:
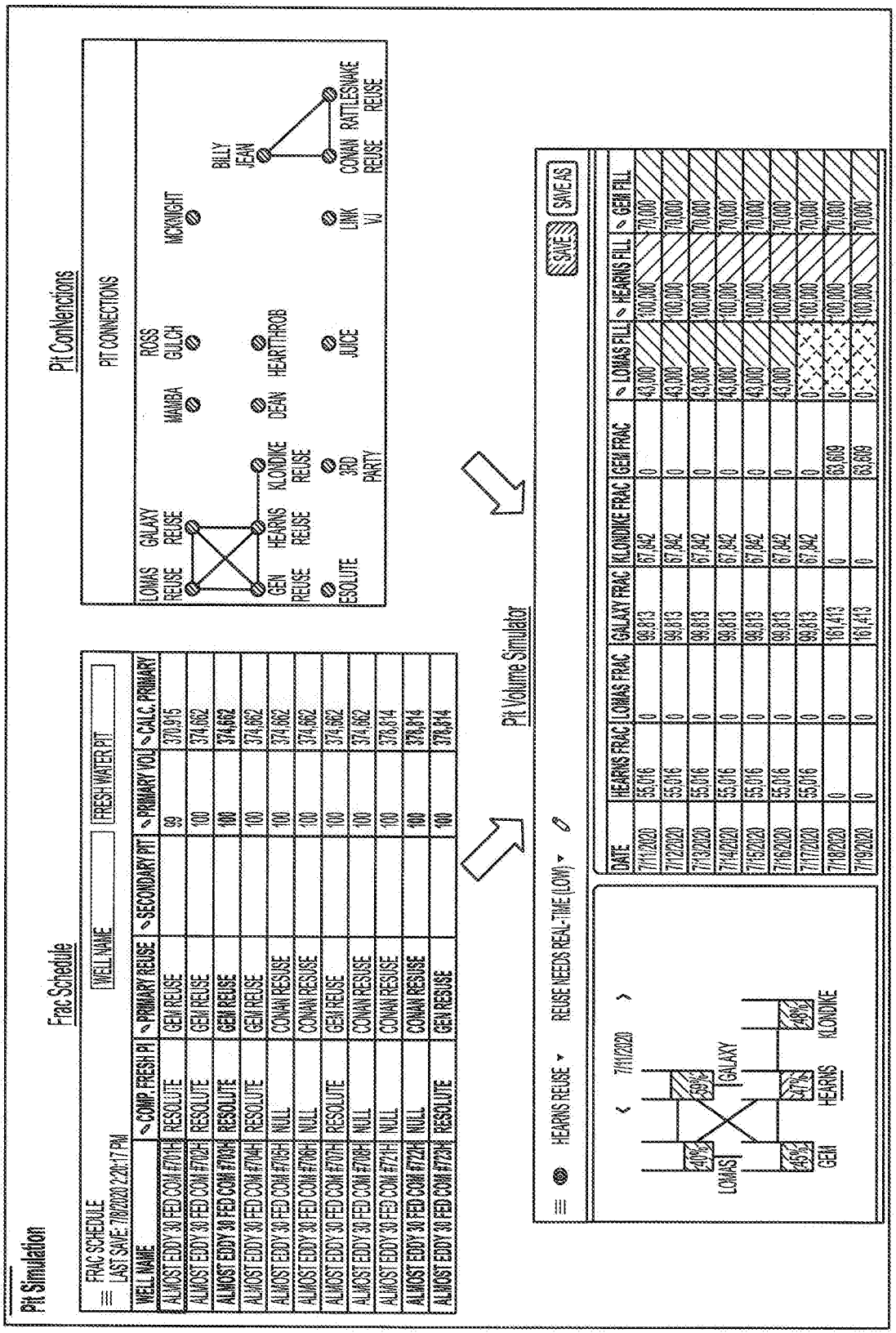
FIG. 13 is a flow chart of an example last mile transfer simulation process according to the present disclosure.

FIG. 13 is a set of screenshots showing user interfaces related to pit volume simulation. A fracturing schedule and a graphical representation of pit connections is used to provide inputs to the pit volume simulator.

Figure 14:
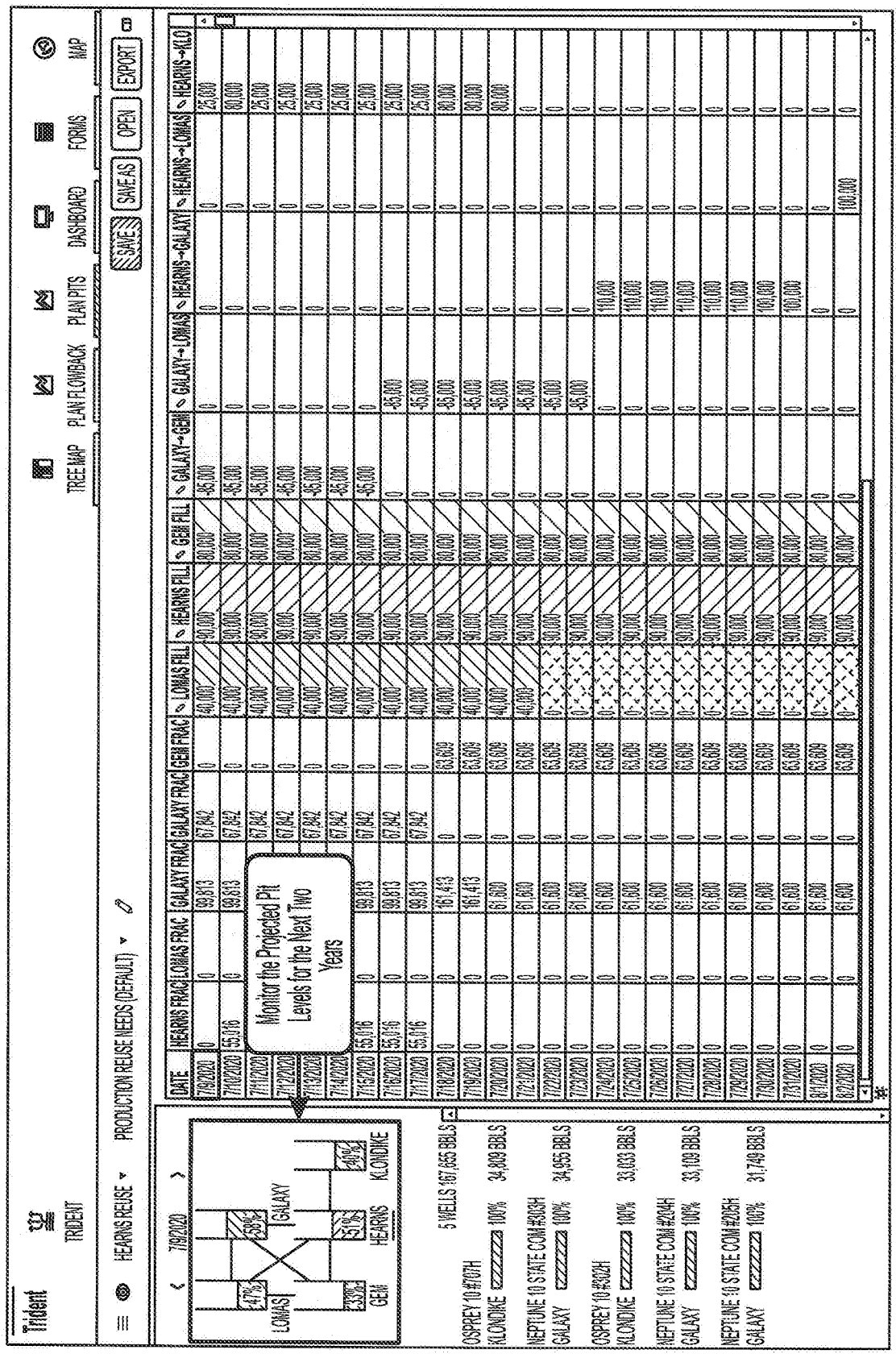

FIG. 14 is a screenshot the user interfaces related to pit volume simulation including an output to monitor projected pit levels over two years.

Figure 15:
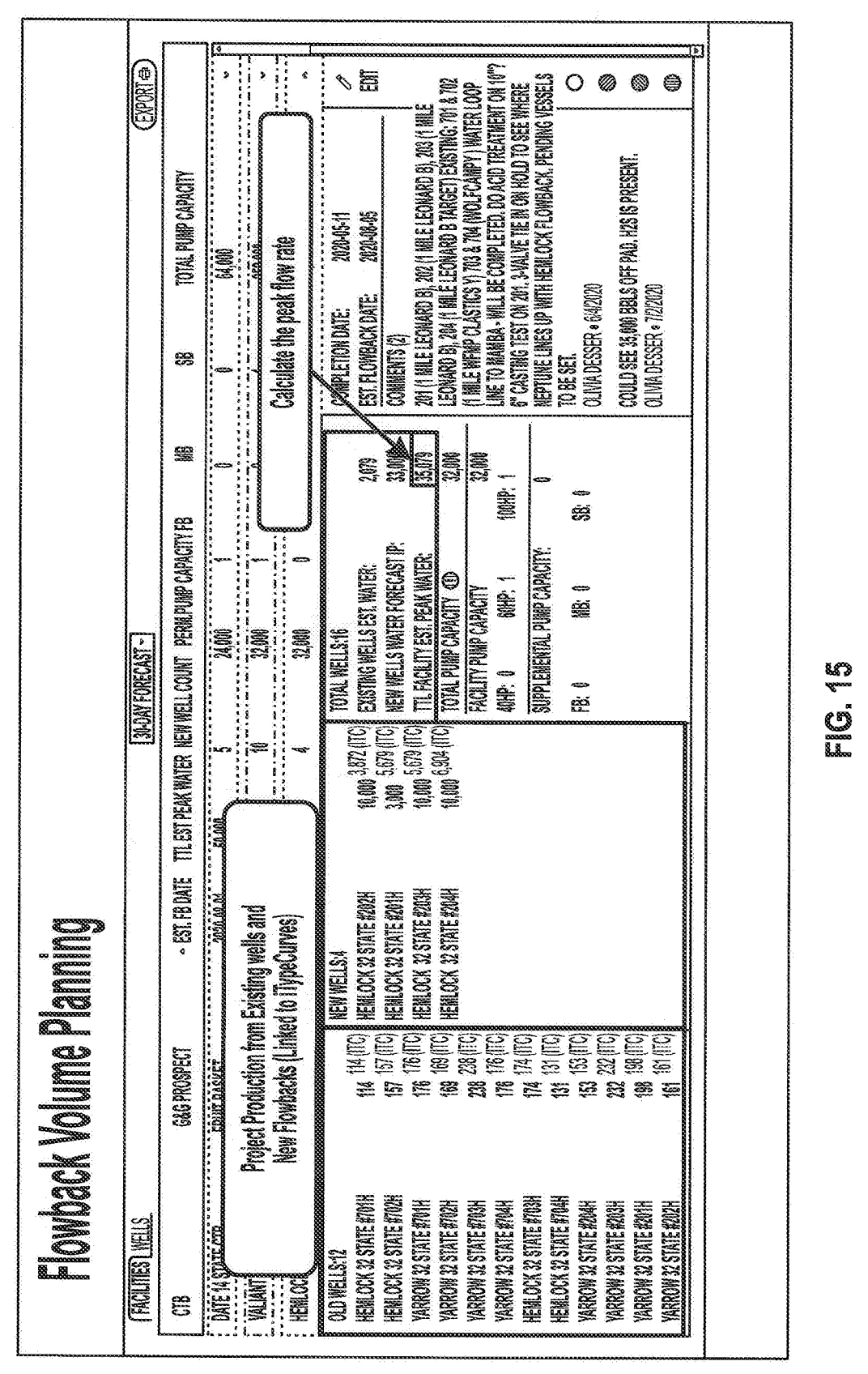

FIG. 15 is a screenshot of a user interface for flowback volume planning showing outputs of projected production for existing wells and new flowbacks. Also shown is a calculation of a peak water flow rate.

Figure 16:
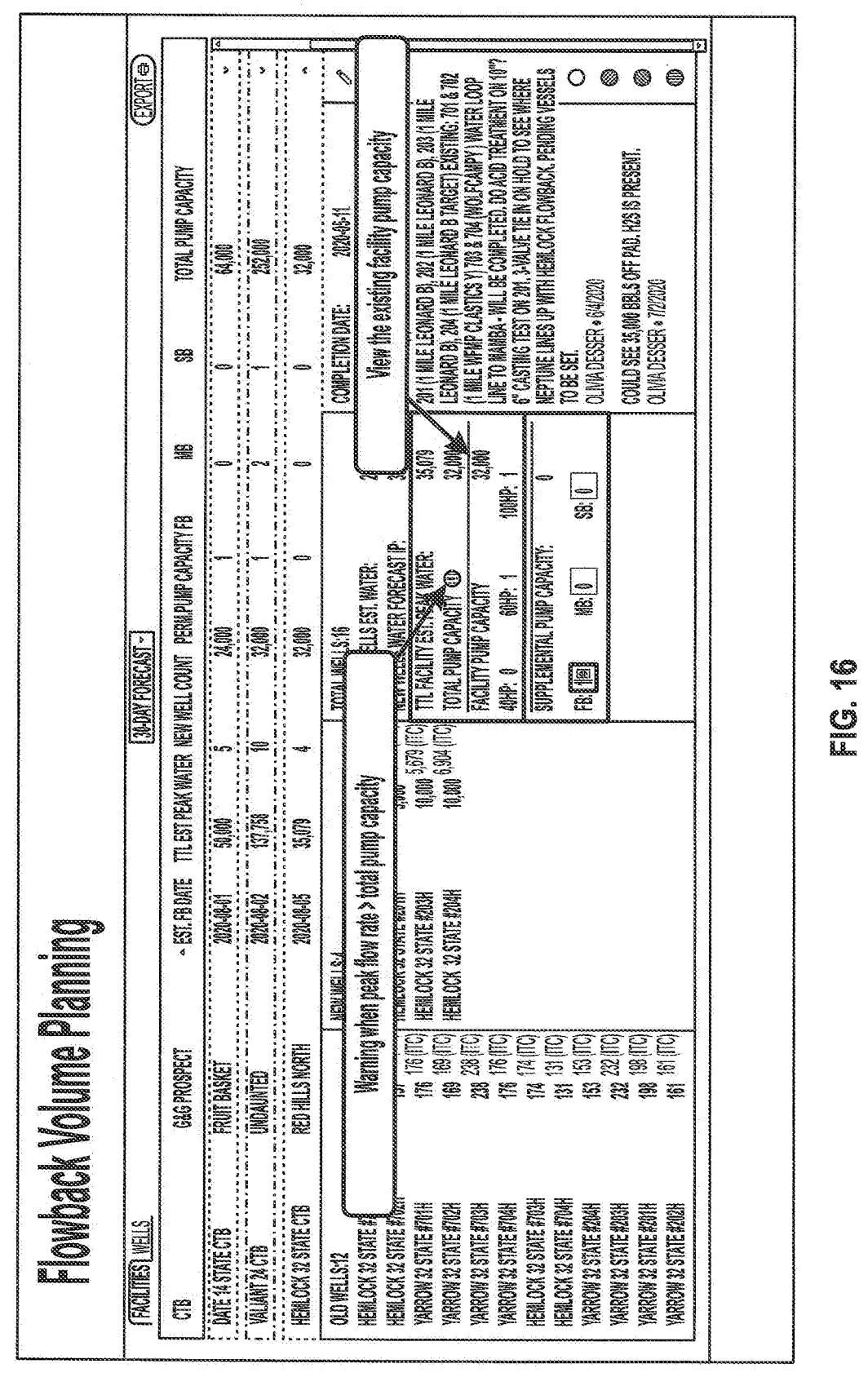

FIG. 16 is a screenshot of a user interface for flowback volume planning showing outputs of warnings where peak flow rate is greater than total pump capacity. Also shown is the existing facility pumping capacity.

Figure 8:
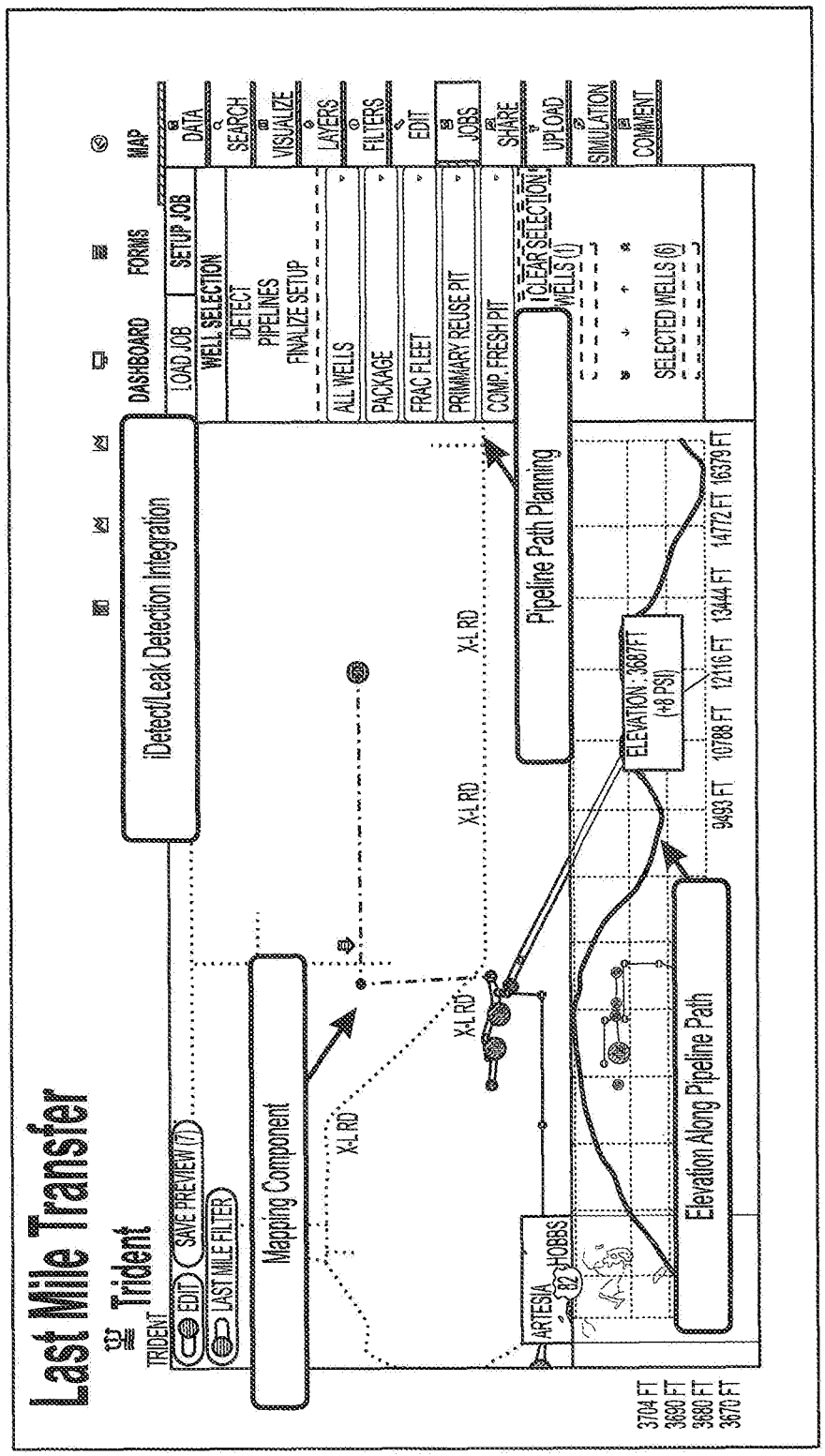
FIG. 8 is a screen shot of the system according to the present disclosure.

FIG. 8 is a screenshot of the last mile transfer user interface. The last mile transfer user interface includes a mapping component, an elevation along pipeline path, and a pipeline path planning section.

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered or modified and all such variations are considered within the scope and spirit of the present invention. Also, the terms in the claims have their plain, ordinary meaning unless otherwise explicitly and clearly defined by the patentee. The indefinite articles "a" or "an," as used in the claims, are each defined herein to mean one or more than one of the element that it introduces.

A number of examples have been described. Nevertheless, it will be understood that various modifications can be made. Accordingly, other implementations are within the scope of the following claims.

What is claimed is:

1. A water management method for managing water used in extraction of fluids from subsurface formations wherein water is stored in a plurality of water reuse pits and further wherein water is obtained from one or more water wells, the method comprising:
    Simulating via non-transitory executable instructions communicated to one or more processors water reuse pit volumes to determine a water level in each of the water reuse pits at a future pit volume simulation time, wherein simulating water reuse pit volumes comprises predicting a future volume of a fluid to be measured or determined at the pit volume simulation time in at least one of the plurality of water reuse pits;
    determining, based on the water reuse pit volumes at a real time and one or more of a past and future time, one or more chemical properties of water stored in one of the water reuse pits, wherein said one or more chemical properties includes the salinity of the fluid in the water reuse pit;
    performing a mapping operation to determine one or more pipeline routes, pit-pit transfer lines, and water gathering systems;
    performing, via non-transitory executable instructions communicated to the one or more processors, a water pit evaporation analysis for a future water pit evaporation simulation time, wherein said water pit evaporation analysis comprises (1) observing the water level in each of the water reuse pits, (2) observing the flow of fluid into each of the water reuse pits, (3) observing the flow of fluid out of each of the water reuse pits; and (4) comparing the observed water level in the water reuse pits with a previously-observed water level in the water reuse pits;
    performing via non-transitory executable instructions communicated to the one or more processors a cost data capture to determine forecast costs at a future cost data capture simulation time,
    wherein the forecast costs comprise fixed and variable costs for managing water, and wherein the fixed and variable costs for managing water comprise data provided to the one or more processors based on one or more invoices containing at least one price for managing water;
    storing said determinations, observations, and comparisons related to the water pit evaporation analysis, mapping operation, and cost data capture into one or more memory communicatively connected to the one or more processors; and
    in response to performing the pit evaporation analysis and cost data capture, routing additional fluid to at least one water reuse pit of the plurality of water reuse pits via the one or more pipeline routes, pit-pit transfer lines, and water gathering systems.

2. The method of claim 1, wherein simulating water reuse pit volumes to determine a water level in each of the water reuse pits at the future pit volume simulation time is based, at least in part on one or more of:
    an amount of water supply available at the future pit volume simulation time;
    an amount of water demand at the future pit volume simulation time;
    connections between two or more water reuse pits at the future pit volume simulation time;
    connections between one or more water reuse pits and one or more source water wells and/or one or more production facilities that use water from the water reuse pits at the future pit volume simulation time; and
    for one or more water reuse pits, an amount of water pit evaporation at the future pit volume simulation time.

3. The method of claim 1, further comprising performing flowback planning to determine the amount of pipeline and pump capacity needed at a future flowback planning simulation time, wherein performing flowback planning to determine the amount of pipeline and pump capacity needed at the future flowback planning simulation time is based, at least in part, on one or more of:
    one or more production schedules for one or more wells, wherein the wells are to extract fluids from one or more of the subsurface formations;
    one or more production forecasts for the one or more wells;
    a number of sand separators, pumps, fuel stores, and electricity access points at the future flowback planning simulation time
    a configuration of sand separators, pumps, fuel stores, and electricity access points at the future flowback planning simulation time; and
    a capacity of each pipeline at the flowback planning time.

4. The method of claim 1, wherein performing water pit evaporation analysis for the future water pit evaporation simulation time is based, at least in part, on one or more of:
    water properties of water in each of the water reuse pits at the future water pit evaporation simulation time, wherein the water properties include one or more of salinity, temperature, and salt content;
    weather data at the future water pit evaporation simulation time, including one or more of humidity, wind speed, and temperature; and water reuse pit dimensions, wherein the pit dimensions include a surface area of water exposed to the atmosphere.

5. The method of claim 1, further comprising:
performing a last-mile transfer analysis to determine routes for water transfer pipelines.

6. The method of claim 5, further comprising:
detecting one or more anomalies in one or more water transfer pipelines.

7. The method of claim 1, wherein the mapping operation is further to view and aggregate SCADA data.

8. A water management system for managing water used in extraction of fluids from subsurface formations, the system comprising:
 a plurality of water reuse pits to store water;
 a plurality of water well to obtain water;
 one or more processors; and
 at least one memory, the memory including non-transitory executable instructions that, when executed cause the one or more processors to:
 simulate via non-transitory executable instructions communicated to one or more processors water reuse pit volumes to determine a water level in each of the water reuse pits at a future pit volume simulation time, wherein simulating water reuse pit volumes comprises predicting a future volume of a fluid to be measured or determined at the pit volume simulation time in at least one of the plurality of water reuse pits;
 determine, based on the water reuse pit volumes at a real time and one or more of a past and future time, one or more chemical properties of water stored in one of the water reuse pits, wherein said one or more chemical properties includes the salinity of the fluid in the water reuse pit;
 perform a mapping operation to determine one or more pipeline routes, pit-pit transfer lines, and water gathering systems;
 perform via non-transitory executable instructions communicated to the one or more processors a water pit evaporation analysis for a future water pit evaporation simulation time, wherein said water pit evaporation analysis comprises (1) observing the water level in each of the water reuse pits, (2) observing the flow of fluid into each of the water reuse pits, (3) observing the flow of fluid out of each of the water reuse pits; and (4) comparing the observed water level in the water reuse pits with a previously-observed water level in the water reuse pits;
 perform via non-transitory executable instructions communicated to the one or more processors a cost data capture to determine forecast costs at a future cost data capture simulation time,
 wherein the forecast costs comprise fixed and variable costs for managing water, and wherein the fixed and variable costs for managing water comprise data provided to the one or more processors based on one or more invoices containing at least one price for managing water;
 store said simulations, determinations, operations, observations, and comparisons related to the water pit evaporation analysis, mapping operation, and cost data capture into the at least one memory; and
 in response to performing the pit evaporation analysis and cost data capture, routing additional fluid to at least one water reuse pit of the plurality of water reuse pits via the one or more pipeline routes, pit-pit transfer lines, and water gathering systems.

9. The system of claim 8, wherein the executable instructions that cause the one or more processors to simulate water reuse pit volumes to determine a water level in each of the water reuse pits at the future pit volume simulation time is based, at least in part on one or more of:
 an amount of water supply available at the future pit volume simulation time;
 an amount of water demand at the future pit volume simulation time;
 connections between two or more water reuse pits at the future pit volume simulation time;
 connections between one or more water reuse pits and one or more source water wells and/or one or more production facilities that use water from the water reuse pits at the future pit volume simulation time; and
 for one or more water reuse pits, an amount of water pit evaporation at the future pit volume simulation time.

10. The system of claim 8, wherein the executable instructions cause the one or more processors to determine the amount of pipeline and pump capacity needed at a future flowback planning simulation time based, at least in part, on one or more of:
 one or more production schedules for one or more wells, wherein the wells are to extract fluids from one or more of the subsurface formations;
 one or more production forecasts for the one or more wells;
 a number of sand separators, pumps, fuel stores, and electricity access points at the future flowback planning simulation time
 a configuration of sand separators, pumps, fuel stores, and electricity access points at the future flowback planning simulation time; and
 a capacity of each pipeline at the flowback planning time.

11. The system of claim 8, wherein the executable instructions that cause the one or more processors to perform water pit evaporation analysis for the future water pit evaporation simulation time is based, at least in part, on one or more of:
 water properties of water in each of the water reuse pits at the future water pit evaporation simulation time, wherein the water properties include one or more of salinity, temperature, and salt content;
 weather data at the future water pit evaporation simulation time, including one or more of humidity, wind speed, and temperature; and
 water reuse pit dimensions, wherein the pit dimensions include a surface area of water exposed to the atmosphere.

12. The system of claim 8, wherein the executable instructions further cause the one or more processors to:
 perform a last-mile transfer analysis to determine routes for water transfer pipelines.

13. The system of claim 12, wherein the executable instructions further cause the one or more processors to:
 detecting one or more anomalies in one or more water transfer pipelines.

14. The system of claim 8, wherein the executable instructions that cause the one or more processors to perform a mapping operation, further cause the one or more processors to display and aggregate SCADA data.

* * * * *